March 13, 1951 V. KOSTREBA 2,545,234
SILO CHUTE CLOSURE
Filed March 22, 1948 2 Sheets-Sheet 1
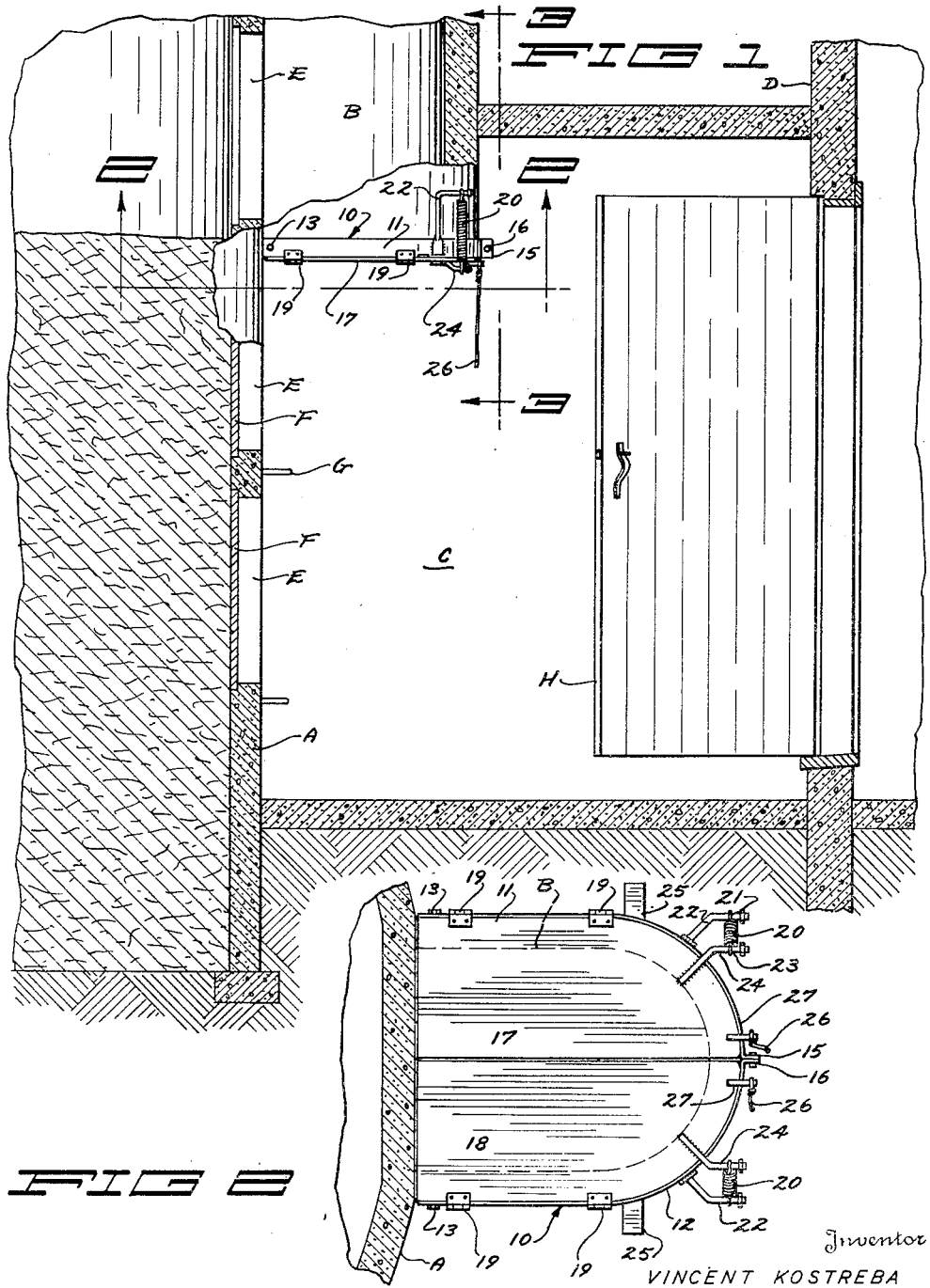
Inventor
VINCENT KOSTREBA
By Carlsen + Hayle
Attorney March 13, 1951 V. KOSTREBA 2,545,234
SILO CHUTE CLOSURE
Filed March 22, 1948 2 Sheets-Sheet 2
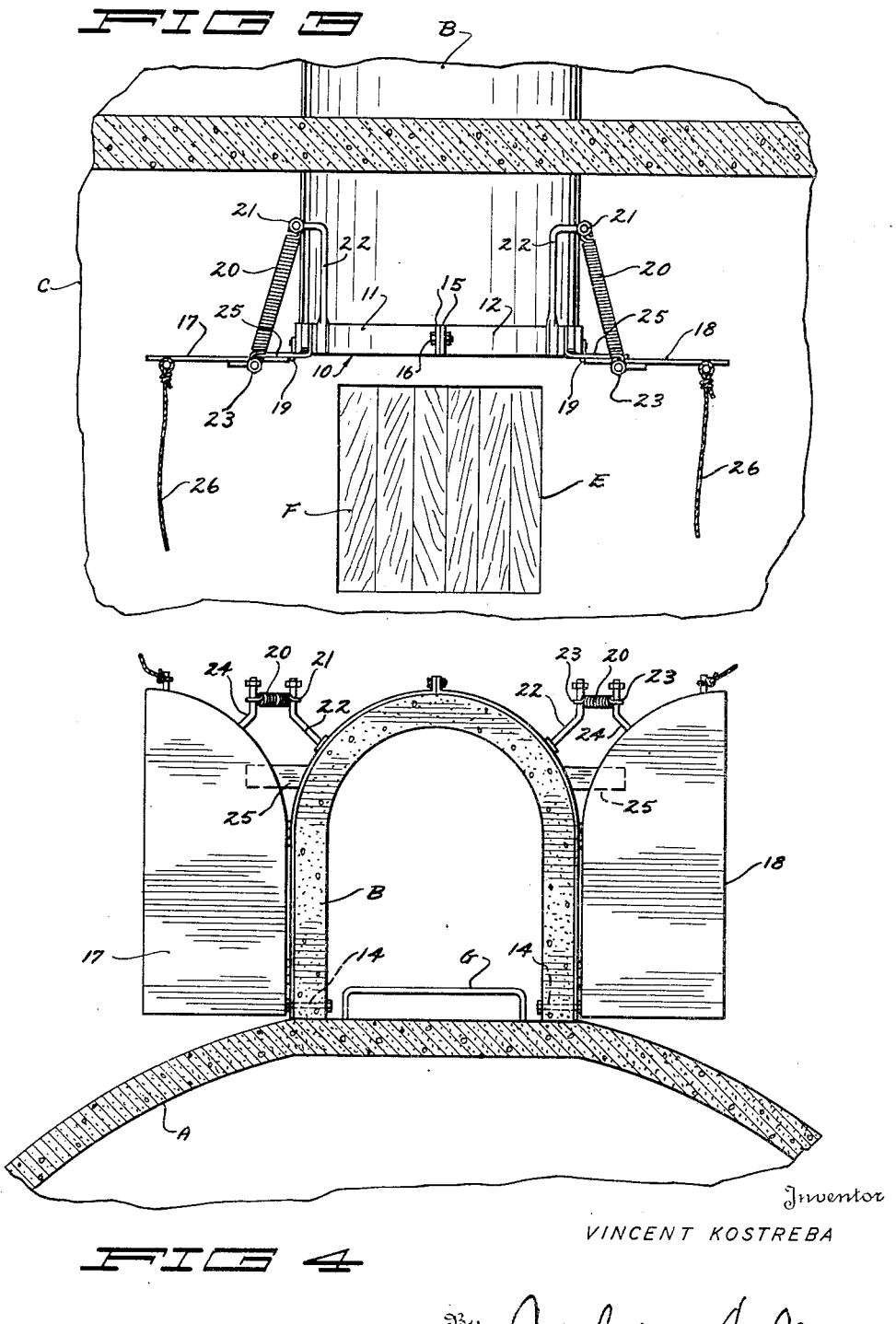
Inventor
VINCENT KOSTREBA
By Carlsen & Dagle
Attorney Patented Mar. 13, 1951

2,545,234

UNITED STATES PATENT OFFICE 2,545,234

SILO CHUTE CLOSURE

Vincent Kostreba, Holdingford, Minn.

Application March 22, 1948, Serial No. 16,241

2 Claims. (Cl. 20—16)

My invention relates generally to improvements in silos and more particularly to means for closing the lower end of the silo chute through which access is had to the silo.

The usual silo installation on the farm is located adjacent the barn or stable and comprises the high, usually cylindrical building in which the ensilage is stored, a small building or silo house at the base thereof which merges with the barn and communicates therewith through a door in the barn wall, and a chute which runs down the side of the silo and opens at its lower end into the silo house. Within the chute are ladder steps and doors in the silo wall and in practice the worker enters the silo house, climbs up into the chute on the steps and opens the doors as required to enter the silo at the level of the ensilage material therein. The ensilage is then thrown down through the chute into the silo house, and as the level of the ensilage lowers by repeated operations of this kind, the doors are removed as required so that the level of the material may always be reached.

In northern climates difficulty is frequently experienced by the ensilage in the silo housing freezing so that it is difficult to remove into the barn and must even when this is done stand for some time in the comparatively warm barn so that it may thaw before being fed to the stock. My invention as its main object overcomes this disadvantage in a simple and practical fashion by the provision of a door or closure means for the lower end of the silo chute where it opens inside the silo house. When the chute is thus closed, the door from the barn into the silo house may be left open whenever required and the barn heat will enter the silo house and keep the ensilage therein from freezing. But without the closure for the chute, this is not practical since the open chute will act as a stack and the heat loss is so great as to not only chill the barn but prevent the heat from accumulating to an extent sufficient to keep the ensilage from freezing or to thaw the material if it is frozen.

Another object of my invention is to provide a simple door construction and means for conveniently mounting it upon the lower end of the chute, either during the construction of the silo or upon present structures.

Other and ancillary objects of my invention will be made apparent in the course of the following specification, reference being had therein to the accompanying drawing wherein one example of a silo chute and silo house structure is shown and wherein:

Fig. 1 is vertical sectional view, partially in elevation, through the lower walls of a silo and barn, the connecting silo house, and chute and showing my closure means for the chute.

Fig. 2 is an inverted plan and sectional view, on an enlarged scale and on the line 2—2 in Fig. 1.

Fig. 3 is an enlarged fragmentary sectional view along the line 3—3 in Fig. 1, showing the chute doors opened.

Fig. 4 is an inverted plan view of the chute and also having the doors opened.

I have illustrated my invention in connection with a silo-barn structure of conventional concrete construction although it may be installed in any type of construction either while the same is being built or in present structures as will be readily understood. As here shown, a lower wall portion of the silo appears at A, the chute at B, the silo house at C and adjacent barn wall at D. The chute B is U-shaped in horizontal cross section, being joined to the exterior wall surface of the silo as clearly shown, and in line with the chute the silo wall A has a series of vertically spaced openings E with removable doors F and a series of ladder steps G. The chute opens at its lower end down through the roof of the silo house C, depending some distance therebelow, and the barn wall D has a door H through which access may be had into the silo house.

As so far described this structure is one widely known and used on the farm and in practice, the worker periodically climbs up through the chute B, entering it through its open lower end, and by removing the doors F as required to reach the level of the ensilage, he enters the silo and throws a quantity of the material down through the chute into the silo house. He then removes the ensilage from the silo house and into the barn as required for feeding. Since the silo house is exterior to the barn it is quite exposed to the weather and in the Northern States the material in the house frequently freezes during bitter weather. If the door H were opened the heat from the barn could flow out into the silo house and used to thaw the ensilage or keep it from freezing, but this not practical in all installations to my knowledge for the reason that the heat loss up through the chute is much too great as will be readily appreciated.

In accordance with my invention, I suitably frame the lower end of the silo chute and provide one, or two as here shown, doors by which the heat may be prevented from escaping up through the chute. When this is done the chute may be closed off and the barn door H opened as required to thaw the ensilage and hold it in good condition, all without undue loss of the barn heat.

The door frame is designated generally at 10 and comprises a U-shaped band, to fit the shape of the chute (Fig. 2) made up of two sections 11 and 12, each of which at one end has an opening for a bolt 13. In the building of a concrete silo the forms and their ties or connections generally make openings 14 through the sides of the chute near its junction with the silo and the bolts 13 are placed through these openings to anchor the frame at these points. The opposite ends of the frame sections are turned outwardly at 15 and apertured to receive a bolt 16 and by tightening this bolt the band may be pulled tight on the chute as will be readily understood.

I here show two doors 17 and 18, while one may be used if desired, and these doors are hinged at 19 to the opposite sides of the frame 10 so that they may swing together and upwardly against the underside of the chute to close it as seen in Figs. 1 and 2, or may swing apart and out to each side to open the chute as seen in Figs. 3 and 4. For holding the doors in either fully closed or fully opened positions I provide for each a retractile coil spring 20. The upper ends of these springs 20 are connected at 21 to arms or brackets 22 secured to the frame 10 and extending upwardly and outwardly to hold the springs above and in vertical alignment with the axes of the door hinges 19. The lower ends of the springs 20 are connected at 23 to fingers 24 outwardly from the doors in spaced relation to their hinge axes. Thus the springs are stretched as the doors are opened or closed and will hold the doors in either of such positions as desired. To limit the opening movements of the doors and prevent them from folding up alongside the chute stop lugs 25 are extended laterally from the frame 10 out into the path of the doors.

For convenience in opening the doors short lengths of rope 26 or the like are attached at 27 near their free edges and dangle down for grasping to manipulate the doors.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A closure for the lower end of a silo chute, comprising a door frame secured to the chute, a pair of doors hinged to opposite sides of the frame to close upwardly over the lower end of the chute, said door frame comprising a band secured to and clamped around the lower end of the chute, separate arms secured to the door frame and the doors, and springs connected between the arms to hold the doors open and closed.

2. A closure for the lower end of a silo chute, comprising in combination, a door frame having two parts each secured at one end to the chute adjacent its junction with the silo and connected together at their opposite ends to pull them tight in clamping engagement about the lower end of the chute, and at least one door hinged to the frame to close upwardly over the lower end of the chute.

VINCENT KOSTREBA.

REFERENCES CITED

The following references are of record in the file of this patent:

UNITED STATES PATENTS

| Number | Name | Date |
|---|---|---|
| 913,357 | Campbell | Feb. 23, 1909 |
| 935,269 | Monta | Sept. 28, 1909 |
| 1,094,726 | Latimer | Apr. 28, 1914 |
| 1,272,468 | Lewis | July 16, 1918 |
| 1,605,498 | Bayley | Nov. 2, 1926 |